United States Patent
Sloan

(10) Patent No.: US 12,017,334 B1
(45) Date of Patent: Jun. 25, 2024

(54) METHOD AND ASSEMBLY FOR GRASPING AND POSITIONING ELECTRIC POWER CABLES IN PAD-MOUNTED TRANSFORMERS

(71) Applicant: Clayton Micheal Sloan, Pocola, OK (US)

(72) Inventor: Clayton Micheal Sloan, Pocola, OK (US)

( * ) Notice: Subject to any disclaimer, the term of this patent is extended or adjusted under 35 U.S.C. 154(b) by 380 days.

(21) Appl. No.: 17/544,659

(22) Filed: Dec. 7, 2021

(51) Int. Cl.
*H02G 1/00* (2006.01)
*B25B 9/00* (2006.01)

(52) U.S. Cl.
CPC ............... *B25B 9/00* (2013.01); *H02G 1/00* (2013.01)

(58) Field of Classification Search
CPC .......................................... H02G 1/00
USPC ..................................... 439/476.1
See application file for complete search history.

(56) References Cited

U.S. PATENT DOCUMENTS

| | | | |
|---|---|---|---|
| 3,540,769 A | 11/1970 | Rosser | |
| 3,666,311 A | 5/1972 | McMullin | |
| 3,788,691 A | 1/1974 | McMullin | |
| 4,669,769 A * | 6/1987 | Polder, Jr. | B25B 9/00 294/111 |
| 5,380,054 A * | 1/1995 | Galvis | E01H 1/1206 294/1.4 |
| 5,378,021 A | 2/1995 | Brewer | |
| 5,538,302 A | 7/1996 | Travis | |
| 5,895,082 A * | 4/1999 | Kaluzny | E01H 1/1206 294/111 |
| 6,079,141 A * | 6/2000 | Washecka | A01M 23/34 114/221 R |
| 6,774,303 B1 | 8/2004 | Brittain et al. | |
| 7,111,526 B1 | 9/2006 | Flojo | |
| 9,656,381 B2 | 5/2017 | Niles et al. | |
| 2007/0035144 A1* | 2/2007 | Buzby | E01H 1/12 294/137 |
| 2015/0130200 A1* | 5/2015 | Niles | B25G 3/18 403/109.1 |
| 2017/0317437 A1* | 11/2017 | Quaedvlieg | H02G 1/02 |
| 2021/0151964 A1* | 5/2021 | Morin | H02G 1/02 |

FOREIGN PATENT DOCUMENTS

| | | | | |
|---|---|---|---|---|
| FR | 2801170 A1 | 5/2001 | | |
| WO | WO-2008025072 A1 * | 3/2008 | ............. | A47F 13/06 |
| WO | WO-2017192575 A1 * | 11/2017 | ............. | H01R 11/15 |

* cited by examiner

*Primary Examiner* — Peter G Leigh
(74) *Attorney, Agent, or Firm* — Dennis D. Brown; Brown Patent Law, P.L.L.C.

(57) ABSTRACT

An apparatus and method using a flexible loop, which is attached to and can be retracted into the head structure on the forward end of a high-voltage shotgun stick, to reach and grasp underground electric power cables and to pull the power cables into the cabinet of a pad-mounted transformer or to otherwise reposition the ends of the power cables in the transformer cabinet.

9 Claims, 3 Drawing Sheets

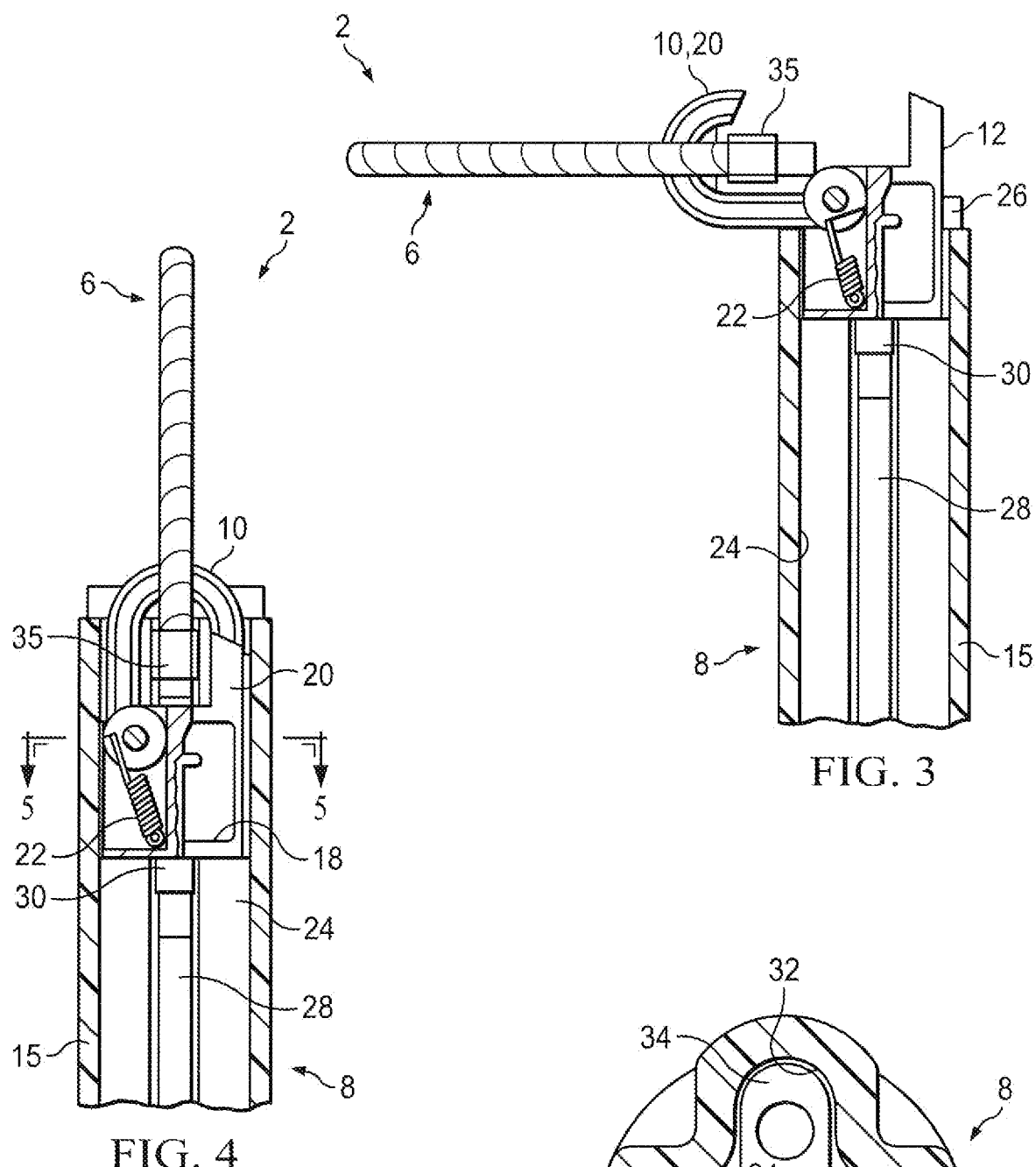
FIG. 3
FIG. 4
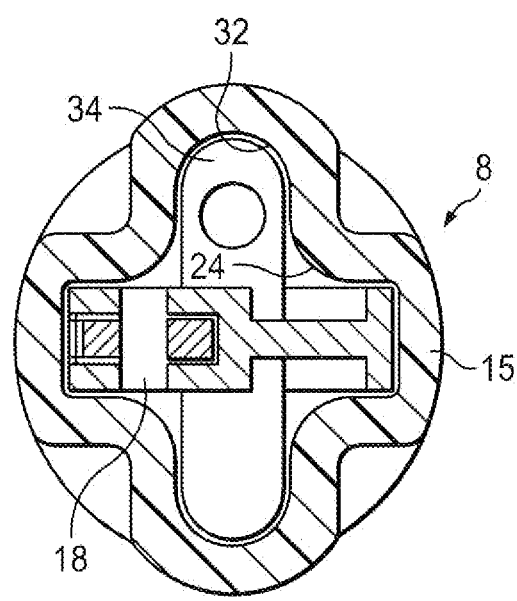
FIG. 5

METHOD AND ASSEMBLY FOR GRASPING AND POSITIONING ELECTRIC POWER CABLES IN PAD-MOUNTED TRANSFORMERS

FIELD OF THE INVENTION

The present invention relates assemblies, methods, and apparatus for reaching, grasping, and pulling or otherwise repositioning electric power cables in pad-mounted transformer units.

BACKGROUND OF THE INVENTION

Pad-mounted electric power transformers are commonly used at service drops for underground power distribution lines for stepping down the voltage of the incoming electrical power supplied by the electric utility company for delivery to the utility customers. The ground-mounted transformer will typically comprise a locked metal cabinet which houses the transformer and is mounted on a concrete pad. The metal cabinet will typically include elbow connectors or other connectors which are used for connecting the primary power cables to the transformer.

For safety purposes, the utility worker will typically use a high-voltage shotgun stick (also commonly referred to as a hot stick) when operating power cable connectors. High-voltage shotgun sticks are also used by utility workers for installing hot line clamps and for performing other operations when working on or around energized electrical distribution lines and equipment.

Underground power cables will typically enter the bottom of a pad-mounted transformer cabinet through the mounting pad. Currently, in order to connect a primary or secondary power cable, the utility worker must reach down into or through the bottom of the cabinet, while often having to avoid other power cables, connectors, etc., in order to grasp the power cable and pull the cable upwardly into the cabinet. For performing this operation, the worker will often wear a rubber safety glove which protects the worker's forearm but does not provide protection above the elbow.

Consequently, a need exists for a method, assembly, and apparatus which can be used to safely reach, grasp, pull, and otherwise manipulate and reposition underground electric power cables in pad-mounted transformer units without exposing the utility worker to the risk of death or serious injury when working around energized cables and other components in the transformer cabinet.

SUMMARY OF THE INVENTION

The present invention satisfies the needs and alleviates the problems discussed above. The invention provides a method, assembly, and apparatus which allow a utility worker to safely reach, grasp, pull, and otherwise manipulate and reposition an underground electric power cable in a pad-mounted transformer without having to physically extend the user's arm into the transformer cabinet.

In one aspect, there is provided a method of grasping an end portion of an underground electric power cable and transferring the end portion of the underground electric power cable from a first location within or beneath a pad-mounted electric power transformer to a second location within the pad-mounted electric power transformer. The method preferably comprises the steps of: (a) extending an open hook or jaw structure, which projects from a forward end of a longitudinally extending head on a forward end of a shotgun stick, into a flexible loop; (b) closing the hook or jaw structure so that the closed hook or jaw structure holds the flexible loop at the forward end of the longitudinally extending head of the shotgun stick; (c) inserting the longitudinally extending head of the shotgun stick and the flexible loop held by the hook or jaw structure into, and/or through a lower portion of, the pad-mounted electric power transformer; (d) placing the flexible loop around the end portion of the underground electric power cable; (e) tightening the flexible loop around the end portion of the underground electric power cable by retracting the hook or jaw structure and at least a portion of the flexible loop rearwardly into the longitudinally extending head of the shotgun stick; and (f) transferring the end portion of the underground electric power cable from the first location within or beneath the pad-mounted electric power transformer to the second location within the pad-mounted electric power transformer using the shotgun stick.

In another aspect, there is provided an apparatus for grasping an end portion of an underground electric power cable and transferring the end portion of the underground electric power cable from a first location within or beneath a pad-mounted electric power transformer to a second location within the pad-mounted electric power transformer. The apparatus preferably comprises: (a) a shotgun stick having a longitudinally extending head on a forward end of the shotgun stick; (b) a flexible loop having a tapered rearward end portion; and (c) a hook or jaw assembly comprising a guide structure and a hook or jaw structure which is held by the guide structure. The guide structure is retained in a longitudinally extending track within the longitudinally extending head of the shotgun stick for reciprocating movement of the hook or jaw assembly to and from (i) an extended position in which the hook or jaw structure projects from a forward end of the longitudinally extending head of the shotgun stick and (ii) a retracted position in which the hook or jaw structure is withdrawn within the longitudinally extending track of the longitudinally extending head of the shotgun stick. When the hook or jaw assembly is in the extended position, the hook or jaw structure can be placed in an open position in which the hook or jaw structure is removably extendable into the flexible loop. The hook or jaw structure is closeable when the hook or jaw structure is extended into the flexible loop so that the flexible loop is retained by the hook or jaw structure and, as the hook or jaw assembly is retracted from the extended position to the retracted position, the tapered rearward end portion of the flexible loop is received in the longitudinally extending track of the longitudinally extending head of the shotgun stick and the flexible loop is tightened.

Further objects, features, and advantages of the present invention will be apparent to those in the art upon examining the accompanying drawings and upon reading the following Detailed Description of the Preferred Embodiments.

BRIEF DESCRIPTION OF THE DRAWINGS

FIG. 3 is a cutaway elevational view of a forward end portion of the inventive apparatus 2.

FIG. 4 is another cutaway elevational view of the forward end portion of the inventive apparatus 2.

FIG. 5 is a cross-sectional view of the inventive apparatus 2 as seen from perspective 5-5 shown in FIG. 4.

DETAILED DESCRIPTION OF THE PREFERRED EMBODIMENTS

Figure 1:
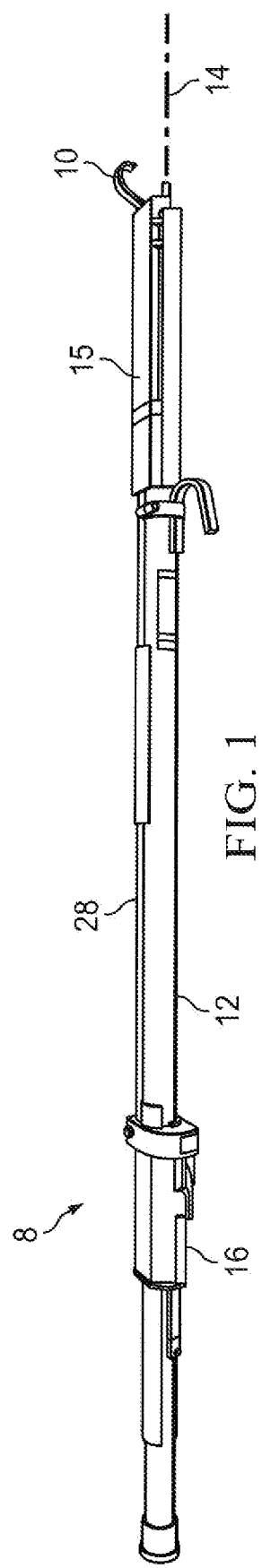
FIG. 1 is a side view of a high-voltage shotgun stick 8 used in an embodiment 2 of the apparatus of the present invention.
Figure 2:
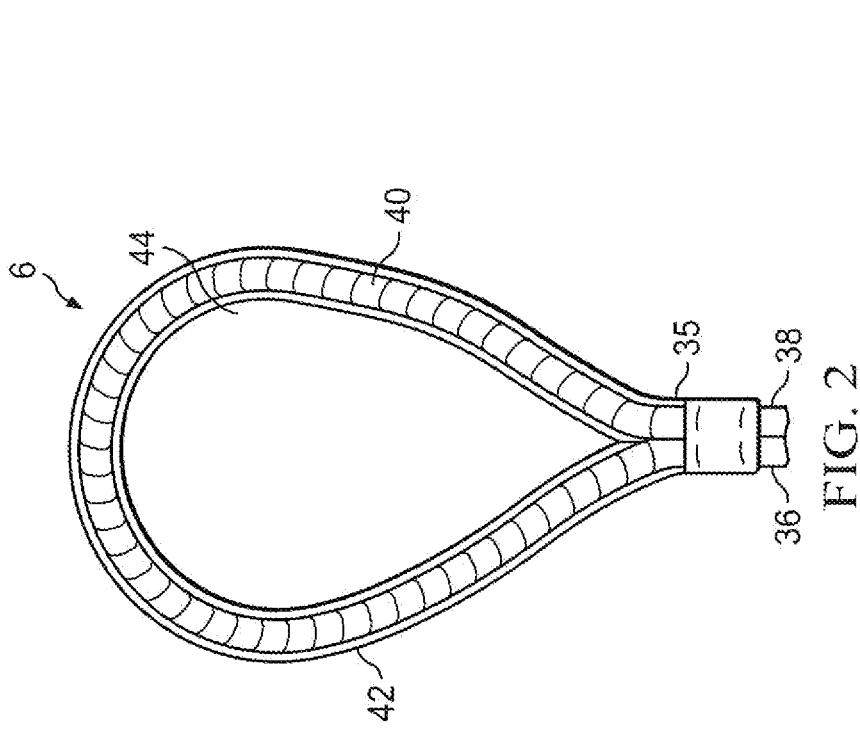
FIG. 2 is an elevational view of a flexible loop 6 used in the inventive apparatus 2.

An embodiment 2 of the inventive apparatus for reaching, grasping, pulling, and/or repositioning an end portion 4 of an underground electric power cable 5 in a pad-mounted transformer is illustrated in FIGS. 3, 4, 6, and 7. The inventive apparatus 2 comprises a flexible loop 6 and a high-voltage shotgun stick 8.

The shotgun stick 8 can be generally any type of high-voltage shotgun stick (also referred to as a hot stick) which is used in the art for performing utility operations when working on or around energized electrical distribution lines and equipment. The shotgun stick 8 includes a retractable hook or jaw assembly 10 and will also typically comprise: an elongate support rod or tube 12 having a longitudinal axis 14; a longitudinally extending head 15 which is provided on the forward end of the shotgun stick 8; and an actuating handle 16 which is positioned on or around a rearward portion of the elongate support rod or tube 12 for forward and rearward movement.

The hook or jaw assembly 10 will typically comprise: a guide structure 18; a hook or jaw structure 20 which is pivotably or otherwise attached to the guide structure 18 for pivoting or otherwise moving the hook or jaw structure 20 to and from (i) an open position as illustrated in FIG. 3 and (ii) a closed position as illustrated in FIG. 4; and a spring or other biasing element 22 connected between the hook or jaw structure 20 and the guide structure 18 for biasing the hook or jaw structure 20 toward its open position.

The guide structure 18 of the hook or jaw assembly 10 is slideably positioned in an interior track 24 which extends longitudinally within the head 15 of the shotgun stick 8 and has an opening 26 at the forward end thereof. Although other configurations may also be used, the guide structure 18 of the hook or jaw assembly 10 and the interior track 24 of the head 15 of the shotgun stick 8 will typically each have a cross-sectional shape which is in the form of a cross (i.e., a +-shape) as illustrated in FIG. 5.

For extending and retracting the hook or jaw assembly 10 longitudinally in the interior track 24 of the head 15, the shotgun stick 8 will also typically include an operating rod 28 which extends forwardly outside of and parallel to the elongate support rod or tube 12 from the actuating handle 16. The operating rod 28 has a forward end 30 which extends into a longitudinally extending side channel 32 of the interior track 24 of the head 15 of the shotgun stick 8 and is connected to a corresponding lateral portion 34 of the guide structure 18 of the hook or jaw assembly 10.

Consequently, by moving the actuating handle 16 forwardly and rearwardly on the elongate support rod or tube 12, the utility worker can extend and retract the hook or jaw assembly 10 in the head 15 of the shotgun stick 8. The actuating handle 16 will also typically include a locking mechanism, such as a toothed slide or rail and a latch with a release trigger, which can be used to releasably lock the hook or jaw assembly 10 at any desired retracted or extended position.

The flexible loop 6 of the inventive apparatus 2 preferably has a tapered rearward end portion 35 which is sized such the tapered rearward end portion 35 of the flexible loop 6 can be pulled into the opening 26 at the forward end of the interior track 24 of the head 15 of the shotgun stick 8 when the hook or jaw assembly 10 is retracted into the head 15 as described below. The flexible loop 6 preferably has a flat, two-dimensional teardrop shape and is preferably formed by positioning the two end portions 36 and 38 of a length of wire rope 40 (preferably a length of steel cable) together side-by-side and crimping (e.g., using a ferrule crimper) or otherwise attaching the side-by-side end portions 36 and 38 of the wire rope 40 together. The flexible loop 6 will preferably be formed using a length of 3/16 inch wire rope. The flexible loop 6 will also preferable have a coating or other covering 42 of abrasion resistant plastic thereon to protect the wire rope 40 from fraying.

Figure 6:
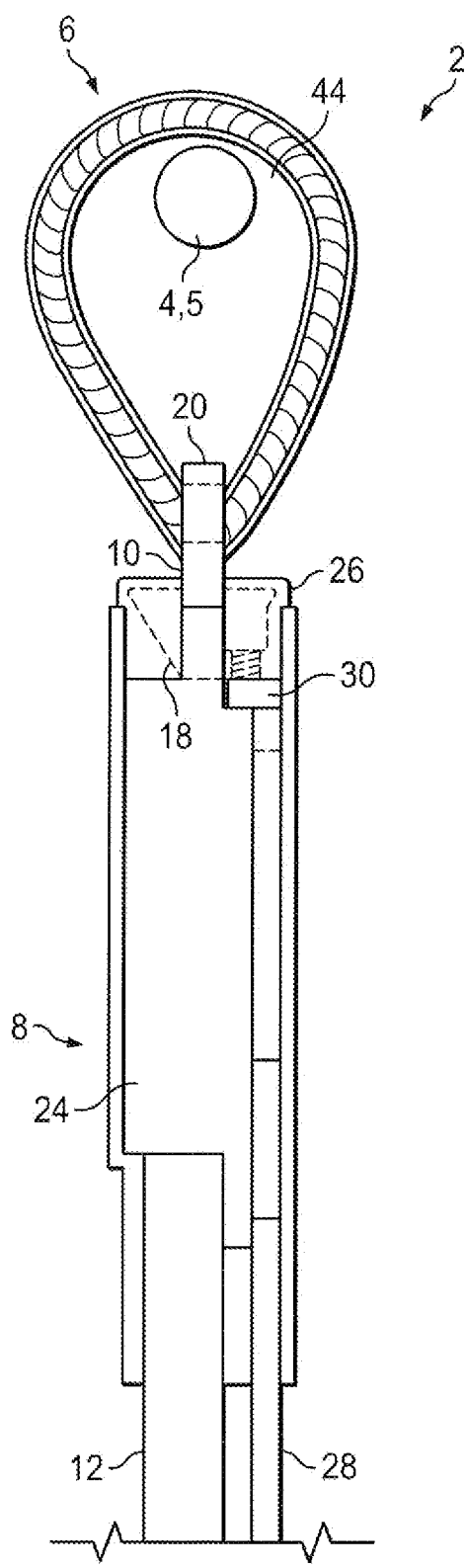
FIG. 6 is another cutaway elevational view of the forward end portion of the inventive apparatus 2 which is rotated 90° from the view shown in FIG. 4.
Figure 7:
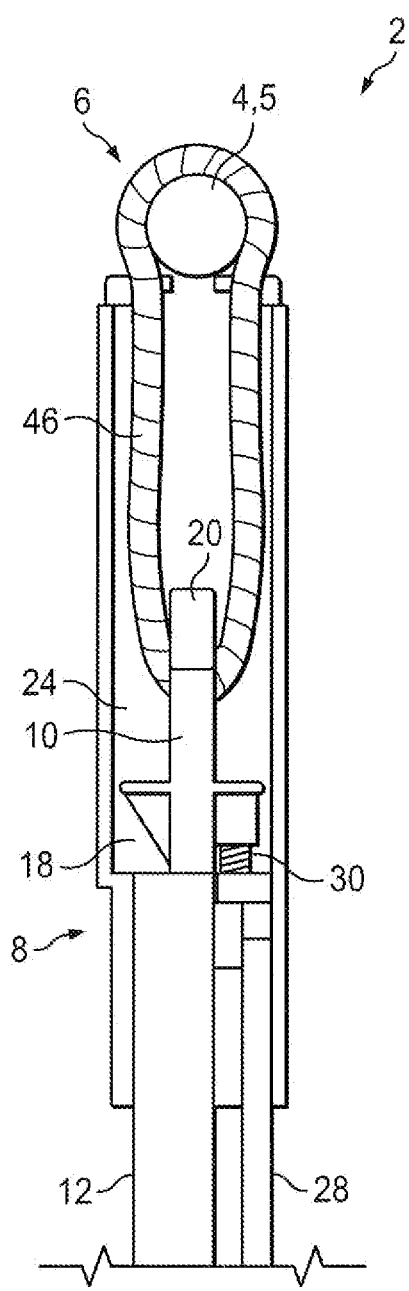
FIG. 7 is another cutaway elevational view of the forward end portion of the inventive apparatus 2 showing the flexible loop 6 in a retracted position.

In the method of the present invention, the actuator handle 16 is used to move the hook or jaw assembly 10 forward to a fully extended position as shown in FIG. 3 in which the hook or jaw structure 20 projects from the forward opening 26 of the head 15 of the shotgun stick 8 and the hook or jaw structure 20 is in its open position. The open hook or jaw structure 20 is then extended into the flexible loop 6, as seen in FIG. 3, and the hook or jaw structure 20 is closed, as seen in FIGS. 4 and 6, so that the closed hook or jaw structure 20 holds the flexible loop 6 at the forward end of the head 15 of the shotgun stick 8. Next, the actuator handle 16 is used to retract the hook or jaw structure 20 into the head 15 of the shotgun stick 8 sufficiently that (a) the tapered rearward end portion 35 of the flexible loop 6 is received in the forward portion of the interior track 24 of the head 15 of the shotgun stick 8 and (b) the open forward portion 44 of the flexible loop 6 projects forwardly outside of the forward end of the head 15 of the shotgun stick 8.

The utility worker then inserts the head 15 of the shotgun stick 8, and the loop 6 which projects therefrom, into the cabinet of the pad-mounted electric power transformer, and/or through a lower portion of the transformer cabinet, and places the projecting loop 6 around the end portion 4 of the underground electric power cable 5, as illustrated in FIG. 6, which the worker desires to pull or reposition. Next, the worker uses the actuating handle 16 of the shotgun stick 8 to retract the hook or jaw assembly 10 further into the head 15 of the shotgun stick 8 to the position shown in FIG. 7 so that (i) a rearward segment 46 of the forward portion 44 of the flexible loop 6 is pinched together and pulled into the interior track 24 of the head 15 of the shotgun stick 8, (ii) the remainder of the open forward portion 44 of the flexible loop 6 which projects from the forward end of the head 15 of the shotgun stick 8 becomes smaller, and (iii) the flexible loop 6 is thereby tightened around the end portion 4 of the power cable 5.

With the end portion 4 of the electric power cable 5 secured by the flexible loop 6 on the forward end of the shotgun stick 8, the utility worker then pulls or otherwise moves or manipulates the shotgun stick 8 to transfer the end portion 4 of the power cable 5 to a different location (e.g., a higher location) in the cabinet of the pad-mounted transformer. Once the end portion 4 of the power cable 5 has been relocated as desired (e.g., for connecting the power cable 5 to an elbow connector), the worker releases the end portion 4 of the power cable 5 by using the actuating handle 16 of the shotgun stick 8 to extend the hook or jaw assembly 10 and the flexible loop 6 to enlarge the portion of the flexible loop 6 which projects from the forward end of the head 15 of the shotgun stick 8 to thereby release the end portion 4 of the power cable 5.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. A method of grasping an end portion of an underground electric power cable and transferring the end portion of the underground electric power cable from a first location within or beneath a pad-mounted electric power transformer to a second location within the pad-mounted electric power transformer, the method comprising the steps of:
    a) extending an open hook or jaw structure, which projects from a forward end of a longitudinally extending head on a forward end of a shotgun stick, into a flexible loop;
    b) closing the hook or jaw structure so that the hook or jaw structure holds the flexible loop at the forward end of the longitudinally extending head of the shotgun stick;
    c) inserting the longitudinally extending head of the shotgun stick and the flexible loop held by the hook or jaw structure into, and/or through a lower portion of, the pad-mounted electric power transformer;
    d) placing the flexible loop around the end portion of the underground electric power cable;
    e) tightening the flexible loop around the end portion of the underground electric power cable by retracting the hook or jaw structure, and at least a portion of the flexible loop, rearwardly into the longitudinally extending head of the shotgun stick; and
    f) transferring the end portion of the underground electric power cable from the first location within or beneath the pad-mounted electric power transformer to the second location within the pad-mounted electric power transformer using the shotgun stick.

2. The method of claim 1 further comprising the flexible loop having a two-dimensional teardrop shape with a tapered rearward end portion which is pulled into the longitudinally extending head of the shotgun stick as the hook or jaw structure is retracted into the longitudinally extending head of the shotgun stick in step (e).

3. The method of claim 2 further comprising the flexible loop being formed of a length of wire rope having two end portions which are crimped together side-by-side to form the tapered rearward end portion of the flexible loop.

4. The method of claim 2 further comprising the flexible loop having a plastic covering thereon.

5. The method of claim 1 further comprising the step, following step (f), of releasing the end portion of the electric power cable by moving the hook or jaw structure forwardly through the longitudinally extending head of the shotgun stick to extend the flexible loop from the forward end of the longitudinally extending head of the shotgun stick.

6. An apparatus for grasping an end portion of an underground electric power cable and transferring the end portion of the underground electric power cable from a first location within or beneath a pad-mounted electric power transformer to a second location within the pad-mounted electric power transformer, the apparatus comprising:
    a shotgun stick having a longitudinally extending head on a forward end of the shotgun stick;
    a flexible loop having a tapered rearward end portion;
    a hook or jaw assembly comprising a guide structure and a hook or jaw structure which is held by the guide structure;
    the guide structure being slidably retained in a longitudinally extending track within the longitudinally extending head of the shotgun stick for reciprocating movement of the hook or jaw assembly to and from (i) an extended position in which the hook or jaw structure projects from a forward end of the longitudinally extending head of the shotgun stick and (ii) a retracted position in which the hook or jaw structure is withdrawn within the longitudinally extending track of the longitudinally extending head of the shotgun stick;
    when the hook or jaw assembly is in the extended position, the hook or jaw structure being placeable in an open position in which the hook or jaw structure is removably extendable into the flexible loop; and
    the hook or jaw structure being closeable when the hook or jaw structure is extended into the flexible loop so that the flexible loop is retained by the hook or jaw structure and, as the hook or jaw assembly is retracted from the extended position to the retracted position, the tapered rearward end portion of the flexible loop is received in the longitudinally extending track of the longitudinally extending head of the shotgun stick and the flexible loop is tightened.

7. The apparatus of claim 6 further comprising the flexible loop having a two-dimensional teardrop shape.

8. The apparatus of claim 7 further comprising the flexible loop being formed of a length of wire rope having two end portions which are crimped together side-by-side to form the tapered rearward end portion of the flexible loop.

9. The assembly of claim 7 further comprising the flexible loop having a plastic covering thereon.

* * * * *